United States Patent
Park et al.

(10) Patent No.: US 11,347,563 B2
(45) Date of Patent: May 31, 2022

(54) COMPUTING SYSTEM AND METHOD FOR OPERATING COMPUTING SYSTEM

(71) Applicant: SAMSUNG ELECTRONICS CO., LTD., Suwon-si (KR)

(72) Inventors: Jun Mo Park, Hwaseong-si (KR); Bum Gyu Park, Suwon-si (KR); Dae Yeong Lee, Hwaseong-si (KR); Lak-Kyung Jung, Suwon-si (KR); Dae Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 16/450,299

(22) Filed: Jun. 24, 2019

(65) Prior Publication Data

US 2020/0142754 A1    May 7, 2020

(30) Foreign Application Priority Data

Nov. 7, 2018    (KR) .................. 10-2018-0135615

(51) Int. Cl.
*G06F 9/48*    (2006.01)
*G06F 9/50*    (2006.01)

(52) U.S. Cl.
CPC .......... *G06F 9/5094* (2013.01); *G06F 9/4856* (2013.01); *G06F 9/4893* (2013.01)

(58) Field of Classification Search
CPC ..... G06F 9/5094; G06F 9/4856; G06F 9/4893
See application file for complete search history.

(56) References Cited

U.S. PATENT DOCUMENTS

| | | |
|---|---|---|
| 8,793,686 B2 | 7/2014 | Aasheim |
| 9,507,640 B2 | 11/2016 | Capps, Jr. et al. |
| 9,612,879 B2 | 4/2017 | Matthes et al. |
| 9,626,295 B2 | 4/2017 | Park et al. |
| 9,720,730 B2 | 8/2017 | Ginzburg et al. |
| 9,939,882 B2 | 4/2018 | Hum et al. |
| 2004/0098718 A1 | 5/2004 | Yoshii et al. |
| 2014/0082630 A1* | 3/2014 | Ginzburg .............. G06F 9/4881 718/105 |
| 2014/0115363 A1* | 4/2014 | Tu ......................... G06F 1/3293 713/323 |
| 2017/0212575 A1* | 7/2017 | Wang ...................... G06F 1/206 |
| 2018/0095792 A1 | 4/2018 | Chien |
| 2018/0314308 A1* | 11/2018 | Savidis ................... G06F 1/329 |
| 2019/0332157 A1* | 10/2019 | Hsu ......................... G06F 1/329 |

* cited by examiner

*Primary Examiner* — Emerson C Puente
*Assistant Examiner* — Jonathan R Labud
(74) *Attorney, Agent, or Firm* — Lee IP Law, PC

(57) ABSTRACT

A computing system includes an ISA identifier to identify an ISA (Instruction Set Architecture) of a task; a core selector to select a core having a highest power-performance efficiency among a plurality of cores based on the identified ISA; and a task allocator to allocate the task to the selected core.

14 Claims, 9 Drawing Sheets

COMPUTING SYSTEM AND METHOD FOR OPERATING COMPUTING SYSTEM

CROSS-REFERENCE TO RELATED APPLICATION

Korean Patent Application No. 10-2018-0135615, filed on Nov. 7, 2018, in the Korean Intellectual Property Office, and entitled: "Computing System and Method for Operating Computing System," is incorporated by reference herein in its entirety.

BACKGROUND

1. Field

Exemplary embodiments relate to a computing system with a multi-core processor and a method for operating the computing system. More particularly, the exemplary embodiments relate to a task allocation method for operating the computing system.

2. Description of the Related Art

A computing system may include a multi-core processor including heterogeneous cores. For example, the heterogeneous cores may process tasks with different types of ISAs (Instruction Set Architecture), respectively. Further, the heterogeneous cores may process tasks with the same ISA. The heterogeneous cores for processing the same ISA may include one core with a high performance and a high power consumption and another core with a low performance and a low power consumption.

Further, the heterogeneous cores of the multi-core processor may have different power efficiencies according to operating conditions. For example, the heterogeneous cores may have power-performance efficiencies that are different from each other according to a bit width of an ISA of a task. In other words, in the heterogeneous cores, power-performance efficiencies of the heterogeneous cores when the heterogeneous cores perform a task with a 32-bit ISA are different from those of the heterogeneous cores when the heterogeneous cores perform a task with a 64-bit ISA. Further, the power-performance efficiencies of the heterogeneous cores may be changed according to a variation of an operating frequency. In general, as a scheduler in an operating system schedules tasks without considering a power-performance efficiency according to an operating frequency and a bit width of an ISA of a task, performance variations between the heterogeneous cores may not be fully reflected in the computing system with the multi-core processor.

SUMMARY

Embodiments are directed to a computing system comprising: an ISA identifier to identify an ISA (Instruction Set Architecture) of a task; a core selector to select a core having a highest power-performance efficiency among a plurality of cores based on the identified ISA; and a task allocator to allocate the task to the selected core.

Embodiments are directed to a computing system comprising: a first type core having a first maximum operating frequency; a second type core having a second maximum operating frequency lower than the first maximum operating frequency; an ISA identifier to identify an ISA (Instruction Set Architecture) of a task; a core selector to select the second type core when a power-performance efficiency of the second type core is higher than the power-performance efficiency of the first type core and to select the first type core when the power-performance efficiency of the first type core is higher than the power-performance efficiency of the second type core at an operating frequency being lower than the second maximum operating frequency based on the identified ISA; and a task allocator to allocate the task to the selected core.

Embodiments are directed to a method for operating a computing system, the method comprising: identifying an ISA (Instruction Set Architecture) of a task; selecting a core having a highest power-performance efficiency among a plurality of cores based on the identified ISA; and allocating the task to the selected core.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
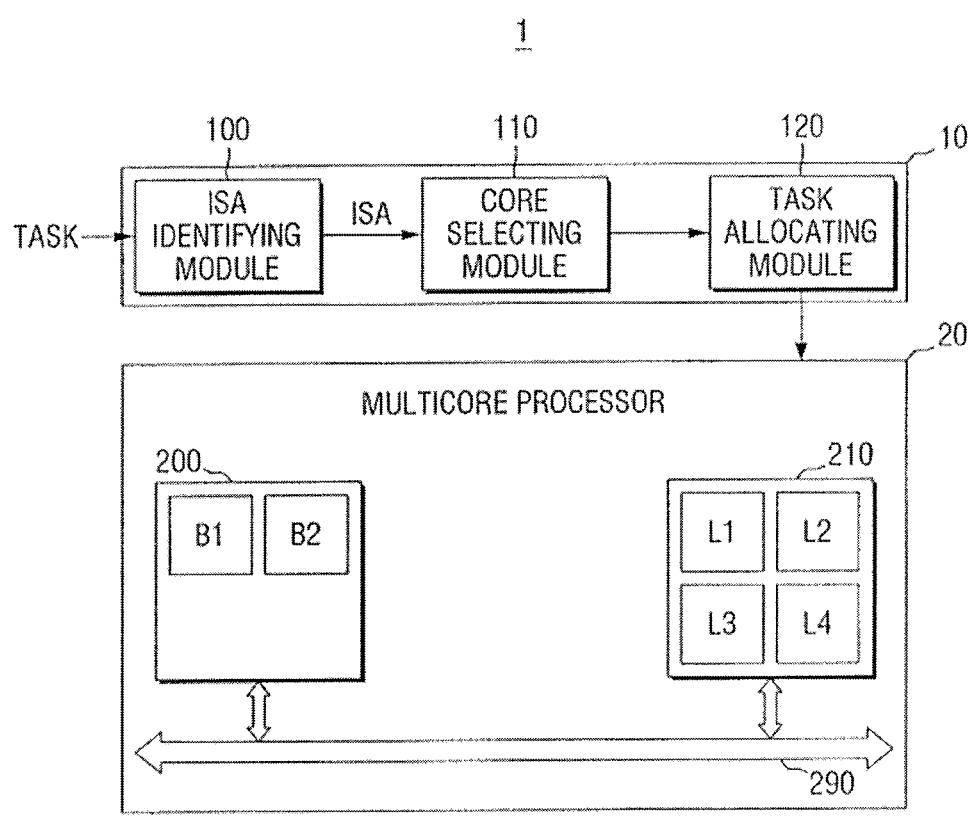
FIG. 1 illustrates a computing system according to an exemplary embodiment.

FIG. 1 illustrates a computing system according to an exemplary embodiment.

Referring to FIG. 1, a computing system 1 may include a scheduler 10 and a multi-core processor 20. For example, the computing system 1 may be implemented as a system-on-chip (SoC).

The multi-core processor 20 may include a plurality of cores. The plurality of cores may include heterogeneous cores. For example, each of the plurality of cores may be a single processing unit. Referring to FIG. 1, the multi-core processor 20 may include first type cores B1 and B2 that are classified as a first type core group 200, and second type cores L1, L2, L3, and L4 that are classified as a second type core group 210. In another exemplary embodiment, the multi-core processor 20 may further include other type core groups, and the number of the core groups may be changeable. Further, the number of cores of each core group may also be changeable.

In some embodiments, the multi-core processor 20 may have a big.LITTLE architecture (e.g., ARM big.LITTLE). The big.LITTLE architecture may include a big core and a LITTLE core. For example, the first type cores B1 and B2 may correspond to the big core of the big.LITTLE architecture. The second type cores L1, L2, L3, and L4 may correspond to the LITTLE core of the big.LITTLE architecture. The big core may have a high performance and a high power consumption, and the LITTLE core may have a low performance and a low power consumption. In other words, the big core may refer to a high-performance core with a high power consumption, and the LITTLE core may refer to a low-performance core with a low power consumption. The big core and the LITTLE core may receive tasks that are dynamically allocated according to operating conditions when the big core and the LITTLE core use the same memory region. For example, tasks may be applied to the heterogeneous cores (e.g., the big core and the LITTLE core) using methods for scheduling tasks, e.g., a cluster migration, an In Kernel Switcher, a heterogeneous multi-processing.

The first type cores B1 and B2 and the second type cores L1, L2, L3, and L4 may be electrically connected to each other via a bus 290. In some embodiments, the bus 290 may be implemented as, for example, an AXI (Advanced Extensible Interface), which is based on an AMBA (Advanced Microcontroller Bus Architecture).

Figure 4:
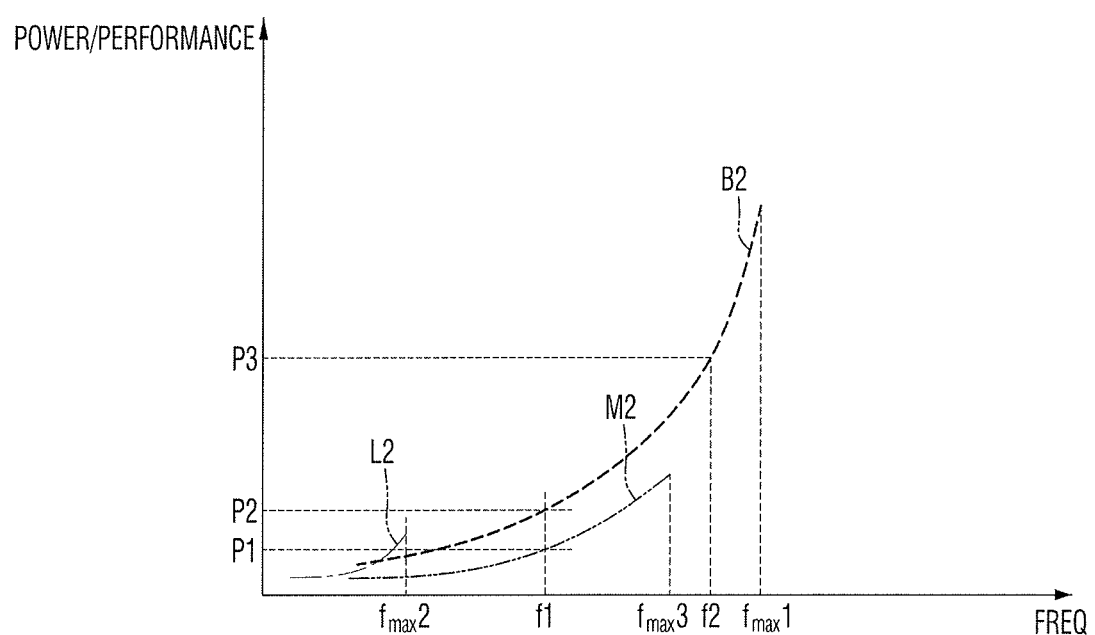
FIG. 4 illustrates a graph diagram for explaining a power-performance table according to an exemplary embodiment.
Figure 6:
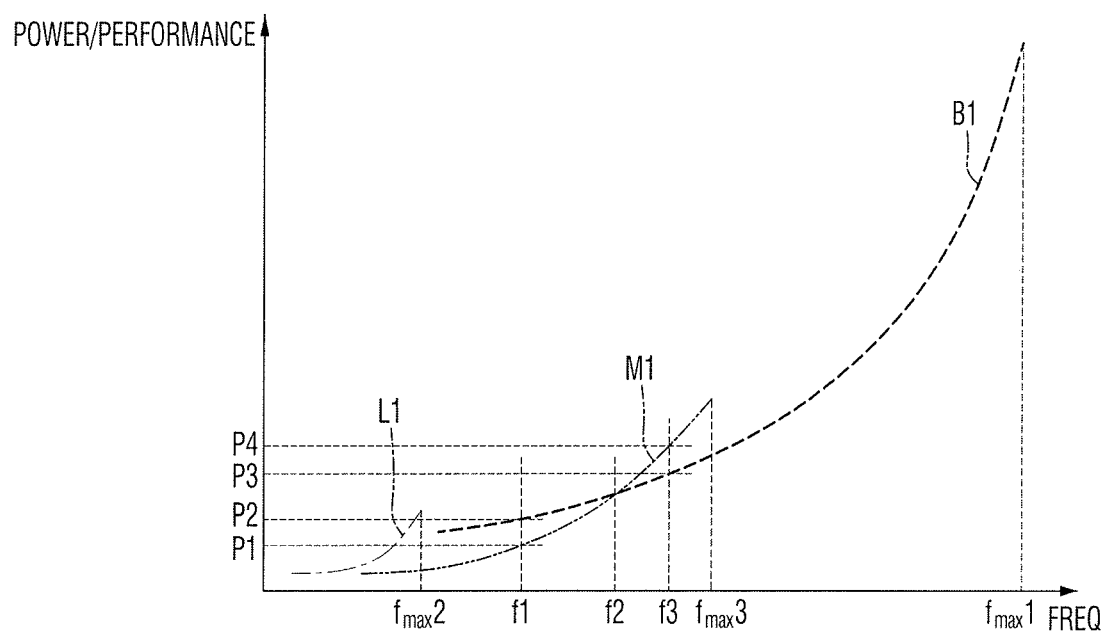
FIG. 6 illustrates a graph diagram for explaining a power-performance table according to an exemplary embodiment.

The first type cores B1 and B2 and the second type cores L1, L2, L3, and L4 of the multi-core processor 20 may have different power-performance efficiencies. Power consumptions of the first type cores B1 and B2 and the second type cores L1, L2, L3, and L4 may be changed according to a bit width of an ISA of a task and an operating frequency of the computing system 1. For example, while the first type cores B1 and B2 are high-performance cores with high power consumptions, and the second type cores L1, L2, L3, and L4 are low-performance cores with low power consumptions, the second type cores L1, L2, L3, and L4 may sometimes consume more power than the first type cores B1 and B2 in order to maintain the same performance according to the bit width of the ISA of the task and the operating frequency of the computing system 1. Thus, when the task is allocated to the multi-core processor 20 (including the first type cores B1 and B2 and the second type cores L1, L2, L3, and L4), a variation in the power consumptions of the first type cores B1 and B2 and the second type cores L1, L2, L3, and L4 may be considered according to the bit width of the task and the operating frequency of the computing system 1 in order to reduce a total power consumption of the multi-core processor 20 and to maintain an operating performance of the multi-core processor 20. Further, the power-performance efficiencies of the first type cores B1 and B2 and the second type cores L1, L2, L3, and L4 will be further described later with reference to FIG. 4 illustrating a power-performance table of a task with a 32-bit ISA and FIG. 6 illustrating a power-performance table of a task with a 64-bit ISA.

The scheduler 10 may include an ISA identifying module 100, a core selecting module 110, and a task allocating module 120, which are elements for allocating the task to the multi-core processor 20 in consideration of a change in power consumptions according to the operating frequency of the computing system 1.

The ISA identifying module 100 may identify an ISA (Instruction Set Architecture) of the task. For example, the ISA identifying module 100 may identify whether the ISA of the task is a 32-bit ISA or a 64-bit ISA and may determine whether the task is a 32-bit task or a 64-bit task. The 32-bit ISA may include an AArch32. The 64-bit ISA may include an AArch64. In another exemplary embodiment, the ISA identifying module 100 may identify whether the ISA of the task is an N-bit ISA or a 2N-bit ISA, where N is a natural number.

The core selecting module 110 may select a core having the highest power-performance efficiency among a plurality of cores of the multi-core processor 20 based on the ISA of the task identified by the ISA identifying module 100, e.g., the bit-number of the ISA of the task. For example, the core selecting module 110 may selects a core for processing the task in consideration of a variation in power consumptions of the plurality of cores according to an operating frequency of the multi-core processor 20.

For example, when the ISA is the 32-bit ISA, the first type cores B1 and B2 and the second type cores L1, L2, L3, and L4 may have different power-performance efficiencies from each other. For example, the first type cores B1 and B2 and the second type cores L1, L2, L3, and L4 may have different power-performance efficiencies according to the operating frequency of the multi-core processor 20. For example, the first type cores B1 and B2 and the second type cores L1, L2, L3, and L4 may have different power-performance efficiencies according to higher and lower operating frequencies. Further, the first type cores B1 and B2 and the second type cores L1, L2, L3, and L4 may have different power-performance efficiencies according to the bit-number of the ISA of the task. For example, the first type cores B1 and B2 and the second type cores L1, L2, L3, and L4 may have different power-performance efficiencies according to a 32-bit ISA and a 64-bit ISA.

For example, when the ISA is a 64-bit ISA, the first type cores B1 and B2 and the second type cores L1, L2, L3, and L4 may have different power-performance efficiencies for each other. On the other hand, when the ISA is a 64-bit ISA, the first type cores B1 and B2 and the second type cores L1, L2, L3, and L4 may have different power-performance efficiencies in a trend different from the case of the 32-bit ISA. For example, the power-performance efficiencies of the first type cores B1 and B2 and the second type cores L1, L2, L3, and L4 when tasks with the 64-bit ISA are executed therein may be different from those of the first type cores B1 and B2 and the second type cores L1, L2, L3, and L4 when tasks with the 32-bit ISA are executed therein. The core selecting module 110 may select the core having the highest power-performance efficiency in consideration of operating conditions (e.g., the bit-number of the ISA and the operating frequency).

The task allocating module 120 may allocate the task to the core selected by the core selecting module 110. For example, the selected core may process the task with a sufficient performance and a relatively small power. For example, the selected core may process the task with the highest power-performance efficiency. For example, a power-performance efficiency may correspond to a ratio of an operating performance to a power consumption. For example, when each of the plurality of cores process the task, a ratio of an operating performance to a power consumption of the selected core is greater than ratios of operating performances to power consumptions of others of the plurality of cores.

When task scheduling is performed by allocating the task to the multi-core processor 20 in consideration of a change in a power consumption according to an operating frequency of the multi-core processor 20 based on the ISA of the task, the power consumption of the multi-core processor 20 may be reduced with maintaining the performance of the multi-core processor 20.

Figure 2:
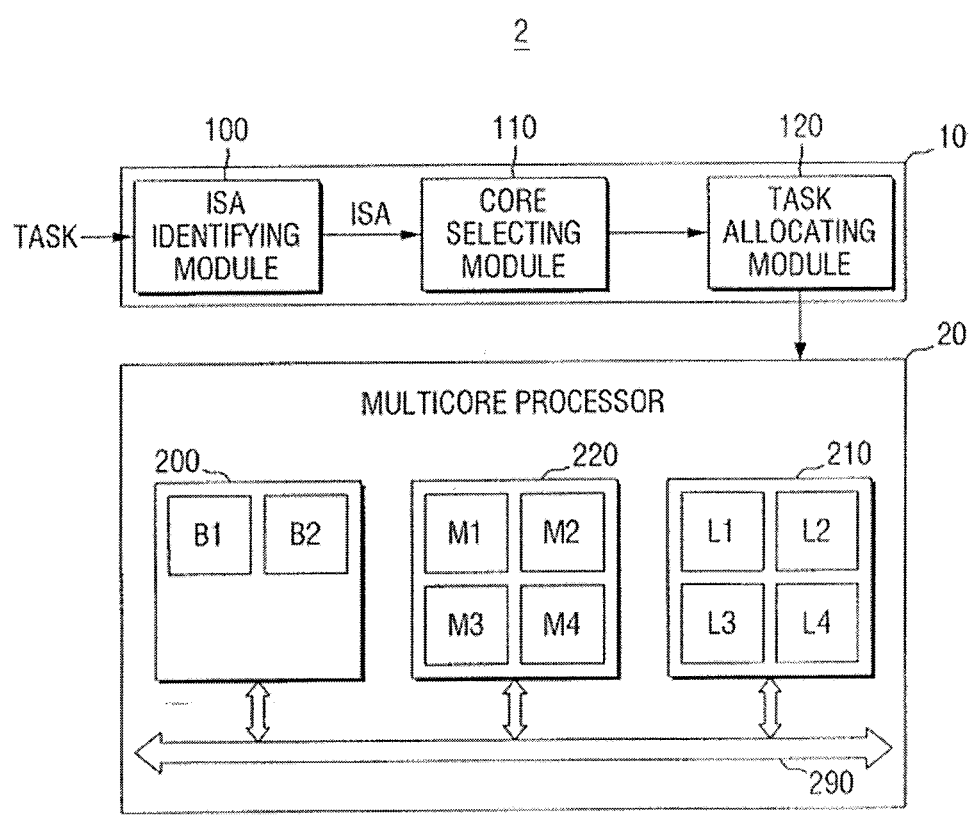
FIG. 2 illustrates a computing system according to an exemplary embodiment.

FIG. 2 illustrates a computing system according to another exemplary embodiment. Referring to FIG. 2, a computing system 2 may differ from the computing system 1 of FIG. 1. For example, a multi-core processor 20 of the computing system 2 may implemented as a tri-cluster architecture which includes the first type cores B1, B2 classified as the first type core group 200, the second type cores L1, L2, L3, and L4 classified as the second type core group 210, and third type cores M1, M2, M3, and M4 classified as a third type core group 220. For example, the number of core groups and the number of cores belonging to each core group may be changeable.

In some embodiments, the tri-cluster architecture may include a big.MIDdle.LITTLE architecture including a big core, a MIDdle core, and a LITTLE core. For example, the first type cores B1 and B2 may correspond to the big core of the big.MIDdle.LITTLE architecture. The second type cores L1, L2, L3, and L4 may correspond to the LITTLE core of the big.MIDdle.LITTLE architecture. The third type cores M1, M2, M3, and M4 may correspond to the MIDdle core of the big.MIDdle.LITTLE architecture. The big core may refer to a high-performance core with a high power consumption. The LITTLE core may refer to a low-performance core with a lower power consumption. The MIDdle core may refer to a core of which a power consumption and a performance level are between the big core and the LITTLE core. The big core, the LITTLE core, and the MIDdle core may dynamically receive allocations of tasks according to their operating conditions, when they use the same memory region.

For example, the first type cores B1 and B2, the second type cores L1, L2, L3, and L4, and the third type cores M1, M2, M3, and M4 may be electrically connected to each other via a bus 290. In some embodiments, the bus 290 may be implemented as, for example, an AXI (Advanced Extensible Interface), which is based on an AMBA (Advanced Microcontroller Bus Architecture).

The first type cores B1 and B2, the second type cores L1, L2, L3, and L4, and the third type cores M1, M2, M3, and M4 may have different power-performance efficiencies from each other. Power consumptions of the first type cores B1 and B2, the second type cores L1, L2, L3, and L4, and the third type cores M1, M2, M3, and M4 may be changed according to a bit width of a task and an operating frequency of the multi-core processor 20. For example, the first type cores B1 and B2 may be high-performance cores with a high power consumption, the second type cores L1, L2, L3, and L4 are low-performance cores with a low power consumption, and the third type cores M1, M2, M3, and M4 may be middle-performance cores with a middle power consumption between the low and high power consumptions.

For example, the first type cores B1 and B2 may be high-performance cores with a high power consumption, the second type cores L1, L2, L3, and L4, and the third type cores M1, M2, M3, and M4 may have different performances and different power consumptions. The first type cores B1 and B2 may sometimes consume more power than the other type cores, the second type cores L1, L2, L3, and L4 may sometimes consume more power than the other type cores, and the third type cores M1, M2, M3, and M4 may sometime consume more power than the other type cores in order to maintain the same performance according to the bit width of the task and the operating frequency of the computing system 1. Thus, as described in FIG. 1, when the task is allocated to the multi-core processor 20 in consideration of a variation of the power consumptions of the first type cores B1 and B2, the second type cores L1, L2, L3, and L4, and the third type cores M1, M2, M3, and M4 according to the bit width of the ISA of the task and the operating frequency, a total power consumption of the multi-core processor 20 may be reduced with maintaining its performance.

The core selecting module 110 may select a core having the highest power-performance efficiency among the first type cores B1 and B2, the second type cores L1, L2, L3, and L4, and the third type cores M1, M2, M3, and M4 of the multi-core processor 20 based on the ISA of the task identified by the ISA identifying module 100. Further, the task allocating module 120 may allocate the task to the core selected by the core selecting module 110.

By allocating the task to the multi-core processor 20 in consideration of a change in a power consumption according to an operating frequency of the multi-core processor 20 based on the ISA of the task, the power consumption of the multi-core processor 20 may be reduced with maintaining the performance of the multi-core processor 20.

Hereinafter, an exemplary embodiment will be only described in which the multi-core processor 20 is implemented as a tri-cluster architecture, and contents to be explained below may be applied to the multi-core processor 20 of FIG. 1 or a multi-core processor having an arbitrary structure.

Figure 3:
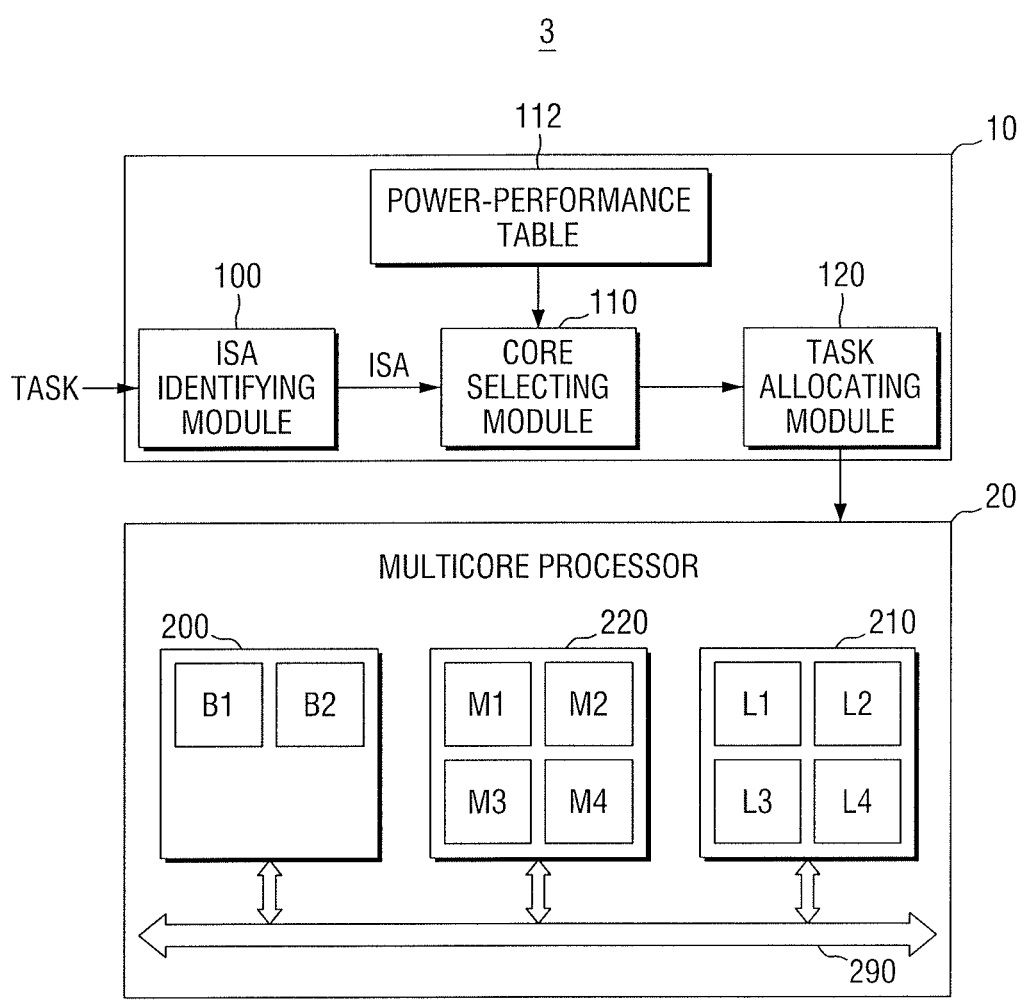
FIG. 3 illustrates a computing system according to an exemplary embodiment.

FIG. 3 illustrates a computing system according to an exemplary embodiment. Referring to FIG. 3, a computing system 3 may be different from the computing system 2 of FIG. 2. For example, the computing system 3 may further include a power-performance table 112.

The power-performance table 112 may include power-performance values of a plurality of cores. For example, each power-performance value may correspond to a ratio of a power consumption to an operating performance of each core. For example, each power-performance value may be different from each power-performance efficiency, which may correspond to a ratio of an operating performance to a power consumption of each core. For example, as each power-performance value of each core is increased, each power-performance efficiencies of each core may be decreased. In other words, each power-performance value of each core may have an inverse relationship with each power-performance efficiency of each core.

The power-performance values of the plurality of cores may be obtained through processing tasks with different types of ISAs according to an operating frequency. For example, the power-performance values of the plurality of cores may be generated through processing a first task with a first type ISA and a second task with a second type ISA by sweeping (varying) the operating frequency.

The power-performance values of the plurality of cores may be stored in the power-performance table 112 separately according to a task with a 32-bit ISA and a task with a 64-bit ISA. For example, the power-performance values may include first power-performance values that are obtained by sweep the operating frequency when the plurality of cores perform a task with a 32-bit ISA and second power-performance values that are obtained by sweep the operating frequency when the plurality of cores perform a task with a 64-bit ISA. Further, the first and second power-performance values may be stored in the power-performance table 112 separately according to types of the plurality of cores and types of the ISAs. For example, the power-performance values may include third power-performance values that are obtained by sweeping the operating frequency when a first type of core performs tasks with a 32-bit ISA or 64-bit ISA and fourth power-performance efficiencies that are obtained by sweeping the operating frequency when a second type of core performs tasks with a 32-bit ISA or a 64-bit ISA.

According to implementation methods, the power-performance table 112 may be separately implemented or may not be separately implemented according to types (bit widths) of ISAs. For example, the power-performance table 112 may be implemented to include a first power-performance table for a 32-bit ISA and a second power-performance table for a 64-bit ISA. Alternatively, the power-performance table 112 may be implemented as a single power-performance table including power performance values (or data) for a 32-bit ISA and power performance values (or data) for a 64-bit ISA. For example, the power-performance table 112 may further include a column for specifying (defining) between the power performance data for the 32-bit ISA and the power performance data for the 64-bit ISA.

The core selecting module 110 may select a core having the highest power-performance efficiencies (i.e., corresponding to the lowest power-performance value) among a plurality of cores by referring to the power-performance table 112. For example, a power-performance efficiency may be a ratio of an operating performance to a power consumption, and a power-performance value may be a ratio of a power consumption to an operating performance. For example, when an ISA of a task is identified as a 32-bit ISA, and when the multi-core processor 20 operates at a first operating frequency, the core selecting module 110 may compare power-performance values of the first type cores B1 and B2, the second type cores L1, L2, L3, and L4, and the third type cores M1, M2, M3, and M4 at the first operating frequency, and may select a core having the lowest power-performance value (i.e., corresponding to the highest power-performance efficiency).

For example, when an ISA of a task is identified as a 64-bit ISA, and when the multi-core processor 20 operates at a second operating frequency, the core selecting module 110 may compare power-performance values of the first type cores B1 and B2, the second type cores L1, L2, L3, and L4 and the third type cores M1, M2, M3, and M4 at the second operating frequency, and may select a core having the lowest power-performance value (i.e., corresponding to the highest power-performance efficiency). Further, the task allocating module 120 may allocate the task to the core selected by the core selecting module 110 such that the selected core may perform the task with the highest power-performance efficiency. For example, when other cores perform the task instead of the selected core, the power-performance efficiencies of the other cores may be lower than that of the selected core.

For example, when tasks are allocated to a plurality of cores of a multi-core process, a change in a power consumption of each core according to an operating frequency and types of ISAs may be considered for the task allocation. Thus, the multi-core processor may process the tasks with the highest power-performance efficiency regardless of a variation of an operating frequency and types of ISAs. In other words, by allocating the task for each core in consideration of a change in a power consumption according to an operating frequency based on ISAs, a power consumption of the multi-core processor 20 may be reduced with maintaining the performance of the multi-processor 20.

Figure 5:
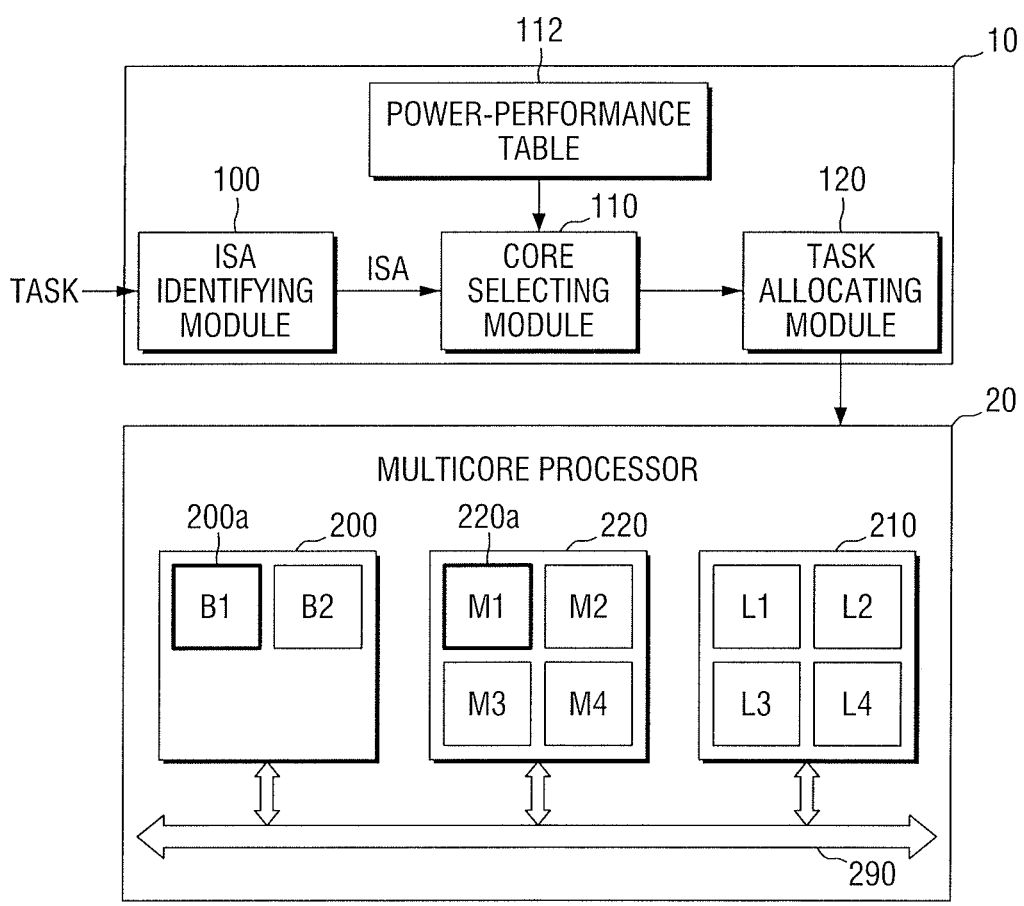
FIG. 5 illustrates an operation of a computing system according to an exemplary embodiment, in connection with FIG. 4.

FIG. 4 illustrates a graph diagram for explaining a power-performance table according to an exemplary embodiment. FIG. 5 illustrates an operation of the computing system according to the embodiment with reference to FIG. 4.

FIG. 4 illustrates a graph diagram illustrating the power-performance values stored in the power-performance table 112 when the ISA of the task is identified as a 32-bit ISA by the ISA identifying module 100 as described above with reference to FIG. 3. A horizontal axis of the graph diagram may mean an operating frequency of the multi-core processor 20, and a vertical axis of the graph diagram may mean a power-performance values (e.g., a ratio of a power consumption to an operating performance) of a plurality of cores of the multi-core processor 20.

A graph B2 may indicate the power-performance values of the first type cores B1 and B2 when the first type cores B1 and B2 perform the task with the 32-bit ISA by sweeping the operating frequency. For example, the first type cores B1 and B2 may have a first maximum operating frequency $f_{max}1$.

A graph L2 may indicate the power-performance values of the second type cores L1, L2, L3, and L4 when the second type cores L1, L2, L3, and L4 perform the task with the 32-bit ISA by sweeping the operating frequency. For example, the second type cores L1, L2, L3, and L4 may have a second maximum operating frequency $f_{max}2$.

A graph M2 may indicate the power-performance values of the third type cores M1, M2, M3, and M4 when the third type cores M1, M2, M3, and M4 perform the task with the 32-bit ISA by sweeping the operating frequency. For example, the third type cores M1, M2, M3, and M4 may have a third maximum operating frequency $f_{max}3$.

For example, the second maximum operating frequency $f_{max}2$ may be lower than the third maximum operating frequency $f_{max}3$. Further, the third maximum operating frequency $f_{max}3$ may be lower than the first maximum operating frequency $f_{max}1$.

For example, when the multi-core processor 20 operates at a first frequency f1, the core selecting module 110 may select the third type cores M1, M2, M3, and M4 as cores having the highest power-performance efficiency, because the power-performance efficiency of the third type cores M1, M2, M3, and M4 is greatest at the first frequency f1 with being compared to other type cores (e.g., the first type cores B1 and B2 and the second type cores L1, L2, L3, and L4). For example, the second type cores L1, L2, L3, and L4 may not operate at the first frequency f1. Further, while the first type cores B1 and B2 may operate at the first frequency f1, the power-performance value P2 of the first type cores B1 and B2 at the first frequency f1 may be greater than the power-performance value P1 of the third type cores M1, M2, M3, and M4 (P2>P1). In other words, the power-performance efficiency of the first type cores B1 and B2 may be lower than the power-performance efficiency of the third type cores M1, M2, M3, and M4. As described above, a power-performance value of each core may have an inverse relationship with a power-performance efficiency of each core.

In this regard, FIG. 5 illustrates that the core selecting module 110 may select a core 220a among the third type core M1, M2, M3, and M4 at the first frequency f1.

On the other hand, for example, when the multi-core processor 20 operates at a second frequency f2 higher than the first frequency f1, the core selecting module 110 may select the first type cores B1 and B2 as cores having the highest power-performance efficiency. Referring to FIG. 4, the second type cores L1, L2, L3, and L4 may not operate at the second frequency f2, and the third type cores M1, M2, M3, and M4 may not also operate at the second frequency f2. Thus, referring to FIG. 5, the core selecting module 110 may select the first type cores B1 and B2 as cores having the highest power-performance efficiency at the second frequency f2. Further, the core selecting module 110 may select the core 200a among the first type cores B1 and B2 such that the selected core 200a may perform the task with the 32-bit ISA at the second frequency f2.

For example, the task allocating module 120 may allocate the task with the 32-bit ISA to the core 200a selected by the core selecting module 110. When task scheduling is performed by allocating the task with the 32-bit ISA in consideration of a change in a power consumption of each core according to the operating frequency based on the ISA of the task (e.g., 32-bit ISA), the power consumption of the multi-core processor 20 may be reduced with maintaining the performance of the multi-core processor 20.

Figure 7:
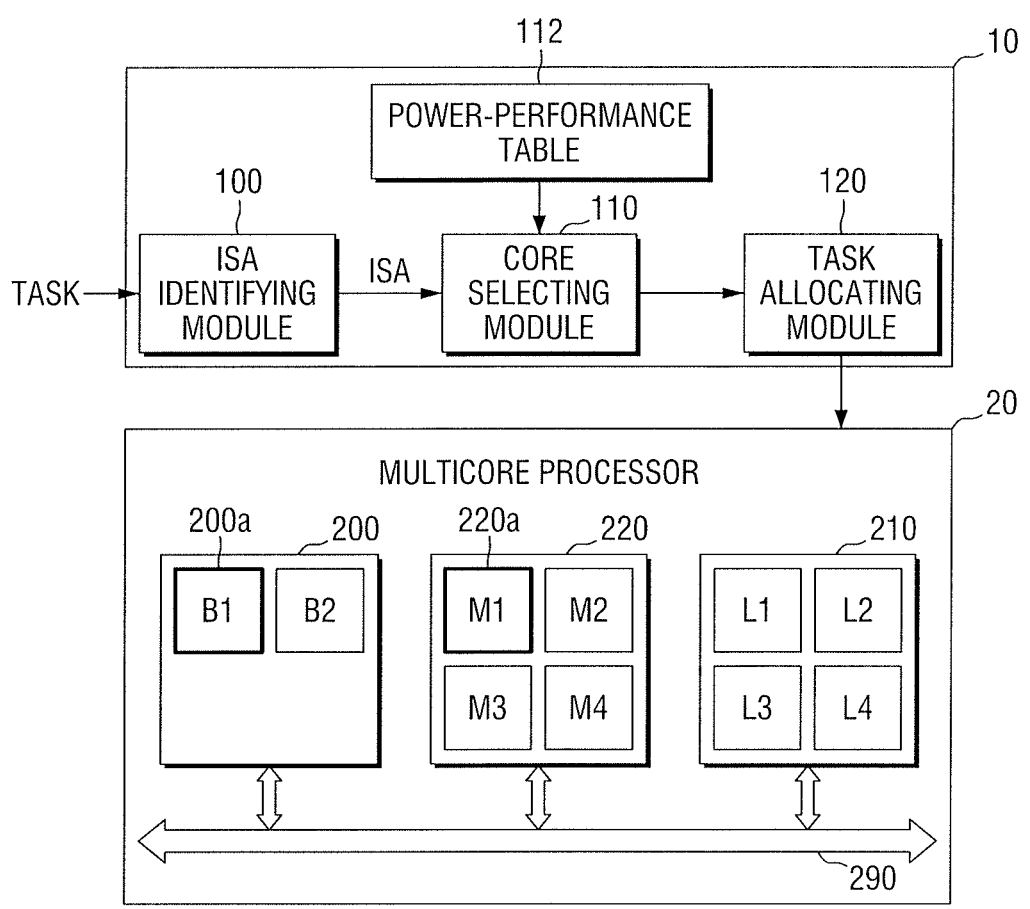
FIG. 7 illustrates an operation of a computing system according to an exemplary embodiment, in connection with FIG. 6.

FIG. 6 illustrates a graph diagram for explaining a power-performance table according to an exemplary embodiment. FIG. 7 illustrates an operation of the computing system according to the exemplary embodiment with reference to FIG. 6.

Referring to FIG. 6, a graph diagram illustrates the power-performance values stored in the power-performance table 112 described above with reference to FIG. 3 when the ISA identified from the task by the ISA identifying module 100 is a 64-bit ISA. A horizontal axis of the graph diagram may mean an operating frequency of the multi-core processor 20, and a vertical axis of the graph diagram may mean a power-performance value (e.g., a ratio of a power consumption to an operating performance) of a plurality of cores of the multi-core processor 20.

A graph B1 may indicate power-performance values of the first type cores B1 and B2 when the first type cores B1 and B2 perform the task with the 64-bit ISA by sweeping the operating frequency. For example, the first type cores B1 and B2 may have a first maximum operating frequency $f_{max}1$.

A graph L1 may indicates power-performance values of the second type cores L1, L2, L3, and L4 when the second type cores L1, L2, L3, and L4 perform the task with the 64-bit ISA by sweeping the operating frequency. For example, the second type cores L1, L2, L3, and L4 may have a second maximum operating frequency $f_{max}2$.

A graph M1 may indicate power-performance values of the third type cores M1, M2, M3, and M4 when the third type cores M1, M2, M3, and M4 perform the task with the 64-bit ISA by sweeping the operating frequency. For example, the third type cores M1, M2, M3, and M4 may have a third maximum operating frequency $f_{max}3$.

For example, the second maximum operating frequency $f_{max}2$ may be lower than the third maximum operating frequency $f_{max}3$. Further, the third maximum operating frequency $f_{max}3$ may be lower than the first maximum operating frequency $f_{max}1$.

For example, when the multi-core processor 20 operates at the first frequency f1, the core selecting module 110 may select the third type cores M1, M2, M3, and M4 as cores having the highest power-performance efficiency, because, the power-performance efficiency of the third type cores M1, M2, M3, and M4 is greatest at the first frequency f1 with being compared to other type cores (e.g., the first type cores B1 and B2 and the second type cores L1, L2, L3, and L4). For example, the second type cores L1, L2, L3, and L4 may not operate at the first frequency f1. Further, while the first type cores B1 and B2 may operate at the first frequency F1, the power-performance efficiency of the first type cores B1 and B2 may be lower than the power-performance efficiency of the third type cores M1, M2, M3, and M4. In other words, the power-performance value P2 of the first type cores B1 and B2 at the first frequency f1 may be greater than the power-performance value P1 of the third type cores M1, M2, M3, and M4 (P2>P1).

Further, FIG. 5 illustrates that the core selecting module 110 may select a core 220a among the third type core M1, M2, M3, and M4 at the first frequency f1. On the other hand, for example, when the multi-core processor 20 operates at a third frequency f3 being higher than the first frequency f1, the core selecting module 110 may select the first type cores B1 and B2 as cores having the highest power-performance efficiency. For example, the second type cores L1, L2, L3, and L4 may not operate at the third frequency f3. Further, while the third type cores M1, M2, M3, and M4 may operate at the second frequency f3, the power-performance efficiency of the third type cores M1, M2, M3, and M4 may be lower than the power-performance efficiency of the first type cores B1 and B2 at the third frequency f3. In other words, the power-performance value P4 of the third type cores M1, M2, M3, and M4 at the third frequency 13 may be greater than the power-performance value P3 of the first type cores B1 and B2 (P4>P3). Further, FIG. 5 illustrates that the core selecting module 110 may select the core 200a (B1) among the first type cores B1 and B2 at the third frequency f3.

Thereafter, the task allocating module 120 may allocate the task with the 64-bit ISA to the core selected by the core selecting module 110. When task scheduling is performed by allocating the task with the 64-bit ISA in consideration of a change in a power consumption of each core according to the operating frequency based on the ISA of the task (e.g., 64-bit ISA), the power consumption of the multi-core processor 20 may be reduced with maintaining the performance of the multi-core processor 20.

FIG. 7 illustrates an operation of a computing system according to an exemplary embodiment, in connection with FIG. 6. Alternatively, the core selecting module 110 may select the core 202a (B2) instead of the core 200a (B1) in FIG. 5 among the first type cores B1 and B2 at the third frequency f3.

Figure 8:
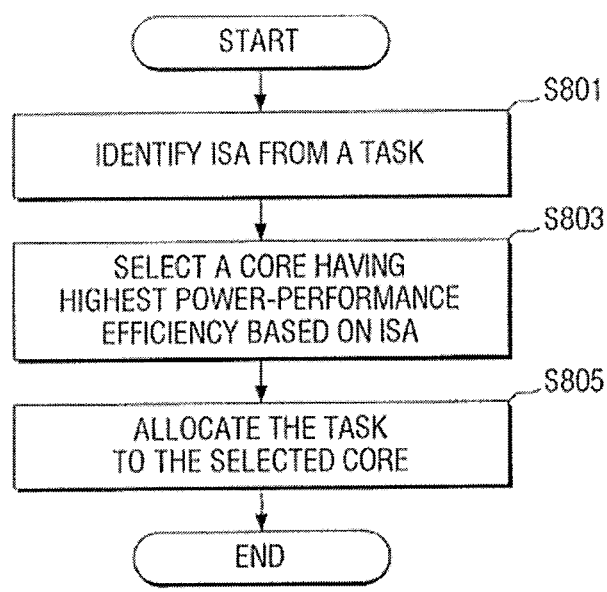
FIG. 8 illustrates a method for operating a computing system according to an exemplary embodiment.

FIG. 8 illustrates a method for operating a computing system according to an exemplary embodiment. Referring to FIG. 8, the method for operating the computing system according to an exemplary embodiment may include identifying an ISA of a task (S801). Further, the above method may include selecting a core having the highest power-performance efficiency among the plurality of cores based on the identified ISA (S803).

In some embodiments, selecting a core having the highest power-performance efficiency may include selecting the core having the highest power-performance efficiency with reference to the power-performance table 112 that may include power-performance values of the plurality of cores according to the operating frequency and each ISA. In addition, the above method may further include allocating the task to the selected core (S805).

Figure 9:
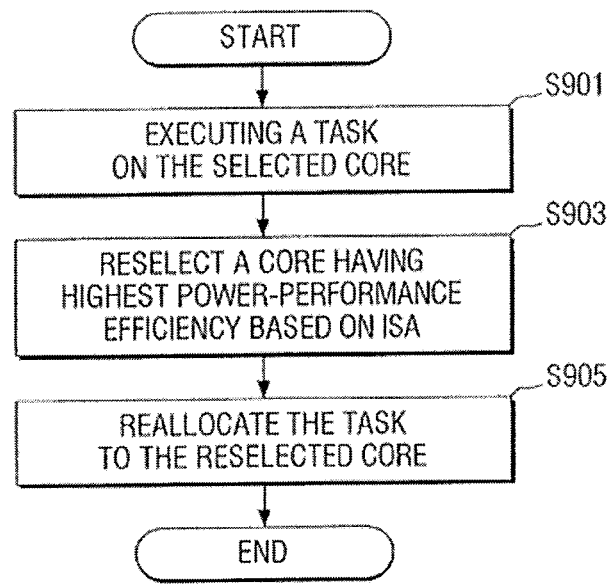
FIG. 9 illustrates a method for operating a computing system according to an exemplary embodiment.

FIG. 9 illustrates a method for operating a computing system according to an exemplary embodiment. Referring to FIG. 9, the method for operating the computing system may include executing a task on the selected core (S901). Further, the method may include reselecting a core having the highest power-performance efficiency among the plurality of cores during an operation of the computing system (S903). For example, the selected core in S805 or S901 may be different from the reselected core in S903. For example, the selected core in S805 and S901 may be selected when the computing system operates at a first operating frequency, and the reselected core in S903 may be selected when the computing system operates a second operating frequency.

For example, the selected core in S805 and S901 may be selected when the computing system processes a task with a first type ISA (e.g., 32-bit ISA), and the reselected core in S903 may be selected when the computing system process a task with a second type ISA (64-bit ISA). In addition, the method may also include moving or reallocating the task, which is allocated to the selected core, to the reselected core (S905).

According to some embodiments, by allocating the task in consideration of the change in a power consumption of each core according to an operating frequency and each ISA, it is possible to perform task scheduling capable of further reducing a power consumption of a multi-core processor including each core, while ensuring an operating performance of the multi-core processor. Thus, the multi-core process may process the task with the highest power-performance efficiency regardless of a variation of an operating frequency and types of ISAs.

The exemplary embodiments may be applied to various electronic devices and electronic systems including the image processing device. For example, the exemplary embodiments may be applied to systems, e.g., a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc. In addition, the exemplary embodiments may be applied to various devices and systems requiring image processing, e.g., an automotive camera, a medical camera, etc.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A computing system, comprising:
a plurality of processor cores that includes a first type core and a second type core, the second type core being a different type than the first type core;
an ISA identifying module to identify an ISA (Instruction Set Architecture) of a task;
a core selecting module in communication with the ISA identifying module, the core selecting module being configured to reduce power consumption by the plurality of processor cores by selecting, from among the first type core and the second type core, a core having a highest power-performance efficiency, based on the identified ISA; and
a task allocating module in communication with the core selecting module, the task allocating module being configured to allocate the task to the selected core,
wherein the core selecting module is configured to select the core having the highest power-performance efficiency by referring to a power-performance table that includes power-performance efficiencies of the plurality of processor cores according to an operating frequency and a type of the ISA, and
wherein the selected core having the highest power-performance efficiency executes the task to thereby reduce the power consumption by the plurality of processor cores.

2. The computing system as claimed in claim 1, wherein the first type core has a first maximum operating frequency, and the second type core has a second maximum operating frequency lower than the first maximum operating frequency.

3. The computing system as claimed in claim 2, wherein the core selecting module reselects a core having the highest power-performance efficiency among the first type core and the second type core during an operation of the computing system, and
the task allocating module moves the task allocated to the selected core to the reselected core.

4. The computing system as claimed in claim 2, wherein the plurality of cores further includes a third type core having a third maximum operating frequency, the third maximum operating frequency being lower than the first maximum operating frequency and being higher than the second maximum operating frequency, and
the core selecting module selects the core having the highest power-performance efficiency among the first type core, the second type core, and the third type core.

5. The computing system as claimed in claim 4, wherein the core selecting module reselects a core having a highest power-performance efficiency among the first type core, the second type core, and the third type core during an operation of the computing system, and
the task allocating module moves the task allocated to the selected core to the reselected core.

6. A computing system, comprising:
a plurality of processor cores that includes:
a first type core having a first maximum operating frequency;
a second type core having a second maximum operating frequency lower than the first maximum operating frequency;
an ISA identifying module to identify an ISA (Instruction Set Architecture) of a task;
a core selecting module in communication with the ISA identifying module, the core selecting module being configured to reduce power consumption by the plurality of processor cores by selecting the second type core when a power-performance efficiency of the second type core is higher than the power-performance efficiency of the first type core, and selecting the first type core when the power-performance efficiency of the first type core is higher than the power-performance efficiency of the second type core, based on the identified ISA; and
a task allocating module in communication with the core selecting module, the task allocating module being configured to allocate the task to the selected core, wherein the core selecting module is configured to select the core having the higher power-performance efficiency by referring to a power-performance table that includes the power-performance efficiencies of the first type core and the second type core according to an operating frequency and a type of the ISA, and wherein the selected core having the highest power-performance efficiency executes the task to thereby reduce the power consumption by the plurality of processor cores.

7. The computing system as claimed in claim 6, wherein the core selecting module reselects a core having a higher power-performance efficiency among the first type core and the second type core during an operation of the computing system, and the task allocating module moves the task allocated to the selected core to the reselected core.

8. The computing system as claimed in claim 6, further comprising:

a third type core having a third maximum operating frequency, the third maximum operating frequency being lower than the first maximum operating frequency and being higher than the second maximum operating frequency, wherein the core selecting module selects a core having a highest power-performance efficiency among the first type core, the second type core, and the third type core.

9. The computing system as claimed in claim 8, wherein the core selecting module reselects a core having a highest power-performance efficiency among the first type core, the second type core, and the third type core during an operation of the computing system, and the task allocating module moves the task allocated to the selected core to the reselected core.

10. A method for operating a computing system, the method comprising:

identifying an ISA (Instruction Set Architecture) of a task;

selecting a core having a highest power-performance efficiency among a plurality of cores based on the identified ISA, wherein selecting the core having the highest power-performance efficiency includes referring to a power-performance table that includes power-performance efficiencies of the plurality of cores according to an operating frequency and a type of the ISA;

allocating the task to the selected core; and executing the task using the selected core to thereby execute the task with improved power-performance efficiency using the plurality of cores.

11. The method for operating the computing system as claimed in claim 10, wherein the plurality of cores include a first type core having a first maximum operating frequency and a second type core having a second maximum operating frequency lower than the first maximum operating frequency, and selecting the core having the highest power-performance efficiency includes selecting the core having the highest power-performance efficiency among the first type core and the second type core.

12. The method for operating the computing system as claimed in claim 11, further comprising:

reselecting a core having a highest power-performance efficiency among the first type core and the second type core during an operation of the computing system; and moving the task allocated to the selected core to the reselected core.

13. The method for operating the computing system as claimed in claim 11, wherein the plurality of cores further include a third type core having a third maximum operating frequency, the third maximum operating frequency being lower than the first maximum operating frequency and being higher than the second maximum operating frequency, and selecting the core having the highest power-performance efficiency among the first type core, the second type core, and the third type core.

14. The method for operating the computing system as claimed in claim 13, further comprising:

reselecting a core having a highest power-performance efficiency among the first type core, the second type core, and the third type core during an operation of the computing system; and moving the task allocated to the selected core to the reselected core.

* * * * *